US 8,675,548 B2

(12) United States Patent
Sohn

(10) Patent No.: US 8,675,548 B2
(45) Date of Patent: Mar. 18, 2014

(54) APPARATUS AND METHOD FOR PROVIDING PACKET SERVICE IN MOBILE COMMUNICATION SYSTEM

(75) Inventor: Chang-Ho Sohn, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1978 days.

(21) Appl. No.: 11/732,192

(22) Filed: Apr. 2, 2007

(65) Prior Publication Data

US 2007/0286118 A1     Dec. 13, 2007

(30) Foreign Application Priority Data

Jun. 7, 2006  (KR) .................. 10-2006-0050835

(51) Int. Cl.
*H04B 7/00* (2006.01)
*H04W 4/00* (2009.01)
*H04W 72/00* (2009.01)

(52) U.S. Cl.
USPC ........... 370/328; 370/252; 370/311; 370/329; 455/450; 455/509

(58) Field of Classification Search
USPC ............................................. 455/432.3, 443
See application file for complete search history.

(56) References Cited

U.S. PATENT DOCUMENTS

| 2005/0153691 | A1* | 7/2005 | Xue et al. ................. 455/432.1 |
| 2006/0073831 | A1* | 4/2006 | Guyot et al. ............... 455/443 |

FOREIGN PATENT DOCUMENTS

| KR | 1020060003149 | 1/2006 |
| WO | WO 03/001762 | 1/2003 |
| WO | WO 2004/014035 | 2/2004 |

* cited by examiner

*Primary Examiner* — Mahendra Patel
*Assistant Examiner* — Joshua Schwartz
(74) *Attorney, Agent, or Firm* — The Farrell Law Firm, P.C.

(57) ABSTRACT

Provided is an apparatus and method for providing a packet service in a mobile communication system. An RNC broadcasts an SIB signal including Always-On availability information. Upon receipt of an RRC connection request message for requesting an Always-On mode, the RNC maintains a preservation state in communication with a core network. A UE detects the Always-On availability information in the SIB signal received from the RNC to determine whether the Always-On mode is available. If the Always-On mode is available, the UE generates the RRC connection request message to transmit the generated RRC connection request message to the RNC.

6 Claims, 3 Drawing Sheets

APPARATUS AND METHOD FOR PROVIDING PACKET SERVICE IN MOBILE COMMUNICATION SYSTEM

PRIORITY

This application claims priority under 35 U.S.C. §119 to an application filed in the Korean Intellectual Property Office on Jun. 7, 2006 and allocated Serial No. 2006-50835, the contents of which are incorporated herein by reference.

BACKGROUND OF THE INVENTION

1. Field of the Invention

The present invention relates generally to an apparatus and method for providing a packet service in a mobile communication system, and in particular, to an apparatus and method for reducing the amount of time required to establish a packet communication in a mobile communication system.

2. Description of the Related Art

With the development of communication technologies, a Code Division Multiple Access (CDMA) mobile communication system has evolved from a conventional voice communication system into a packet communication system capable of transmitting a large amount of data (e.g., voice data, packet data, and circuit data), and into a multimedia broadcast/communication system capable of transmitting multimedia data.

FIG. 1 is a schematic block diagram of a conventional asynchronous mobile communication network supporting a packet service.

Referring to FIG. 1, a user equipment (UE) (a mobile communication terminal) 130 is equipped with hardware or software for packet communication and thus can receive packet data. A UMTS Terrestrial Radio Access Network (UTRAN) is used to connect the UE 130 to a core network 100. The UTRAN includes a plurality of radio access stations (RASs) 110 and 120. The RAS 110 includes a radio network controller (RNC) 111 and a plurality of Node Bs 113 and 115 controlled by the RNC 111. Likewise, the RAS 120 includes an RNC 112 and a plurality of Node Bs 114 and 116 controlled by the RNC 112. In addition, a plurality of cells are located in each of the Node Bs 113 to 116.

The RNC 111 controls not only the Node Bs 113 and 115 but also the cells in the Node Bs 113 and 115. Likewise, the RNC 112 controls not only the Node Bs 114 and 116 but also the cells in the Node Bs 114 and 116.

The total number of Node Bs controlled by each of the RNCs and the total number of the cells in each of the Node Bs are determined depending on service providers and the performances of the corresponding RNC and the corresponding Node B.

The UE 130 must connect via the UTRAN to the core network 100 in order to receive a packet service. Therefore, a user of the UE 130 is inconvenienced because he/she must wait for completion of the connection for the packet service.

SUMMARY OF THE INVENTION

An object of the present invention is to substantially solve at least the above problems and/or disadvantages and to provide at least the advantages below. Accordingly, an object of the present invention is to provide an apparatus and method for providing a packet service in a mobile communication system.

Another object of the present invention is to provide an apparatus and method for reducing the amount of time required to establish communication for a packet service in a mobile communication system.

A further object of the present invention is to provide an apparatus and method for reducing the amount of time required to establish communication for a packet service in a mobile communication system by always preserving a packet communication connection with a wired communication section that uses wired resources that are cheaper than wireless resources.

According to one aspect of the present invention, there is provided a mobile communication system for providing a packet service, including an RNC for broadcasting an SIB (System Information Block) signal including Always-On availability information and, upon receipt of an RRC (Radio Resource Control) connection request message for requesting an Always-On mode, maintaining a preservation state in communication with a core network; and a UE for detecting the Always-On availability information in the SIB signal received from the RNC to determine whether the Always-On mode is available and, if the Always-On mode is available, generating the RRC connection request message to transmit the generated RRC connection request message to the RNC.

According to another aspect of the present invention, there is provided a method for reducing a packet communication connection time in a mobile communication system, including broadcasting an SIB signal from an RNC; detecting, at a UE, the SIB signal received from the RNC to determine whether an Always-On mode is available; if the Always-On mode is available, generating an RRC connection request message and transmitting the generated RRC connection request message to the RNC; performing, at a core network, a location registration process and a packet service connection process for the UE through the RNC; upon completion of the location registration process and the packet service connection process, transmitting an RRC connection release message to the UE to release a wireless connection between the UE and the RNC; and maintaining, at the RNC, a wired connection between the RNC and the core network to be in a preservation state.

According to a further aspect of the present invention, there is provided a method for reducing a packet communication connection time at an RNC in a mobile communication system, including broadcasting an SIB signal; upon receipt of an RRC connection request message for requesting an Always-On mode from a UE, connecting to a core network to perform a location registration process and a packet service connection process for the UE; upon completion of the location registration process and the packet service connection process, transmitting an RRC connection release message to the UE to release a wireless connection between the UE and the RNC; and maintaining a wired connection with the core network to be in a preservation state.

According to still another aspect of the present invention, there is provided a method for reducing a packet communication connection time at a UE in a mobile communication system, including receiving an SIB signal from an RNC to determine whether an Always-On mode is available; if the Always-On mode is available, generating an RRC connection request message and transmitting the generated RRC connection request message to the RNC; performing a location registration process and a packet service connection process at a core network through the RNC; and upon receipt of an RRC connection release message from the RNC, releasing a wireless connection with the RNC.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

The present invention provides an apparatus and method for reducing the amount of time required to establish a packet communication in a mobile communication system, and in particular an apparatus and method for always preserving a packet communication connection with a wired communication section.

Figure 1:
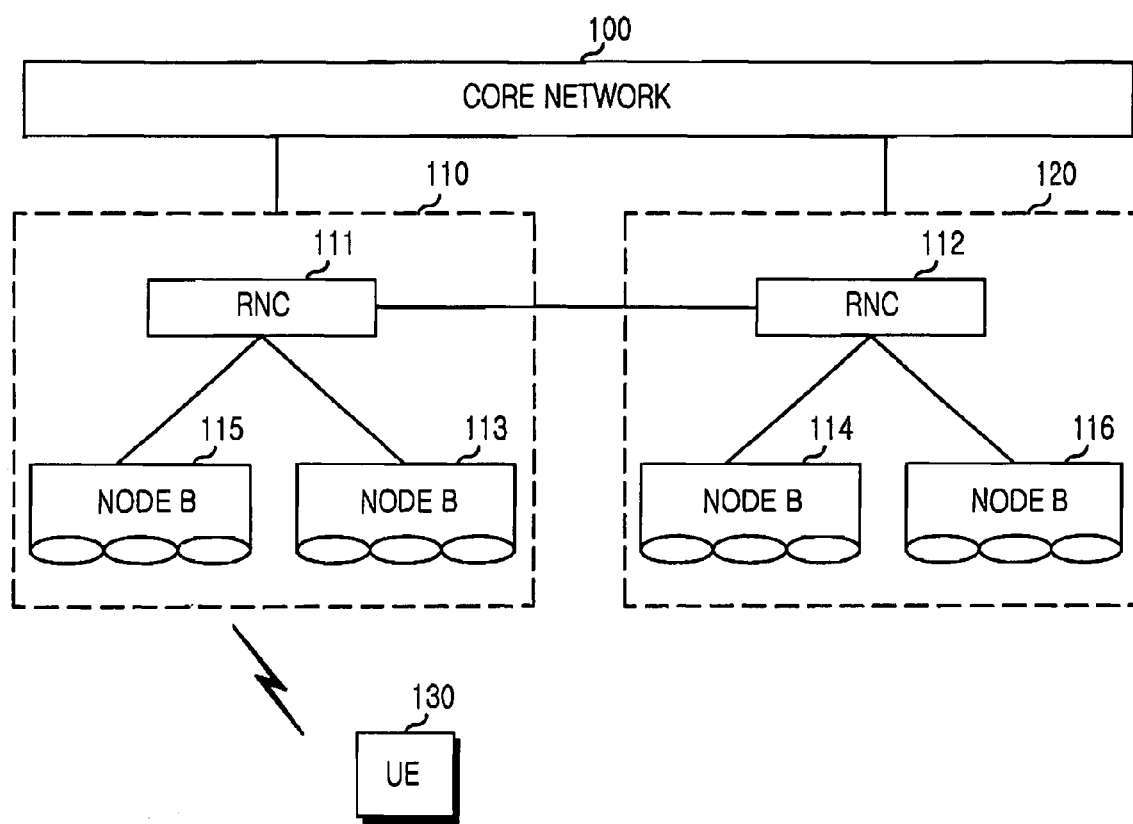
FIG. 1 is a schematic block diagram of a conventional asynchronous mobile communication network supporting a packet service.

An asynchronous mobile communication network supporting a packet service according to the present invention is similar in structure to the conventional asynchronous mobile communication network of FIG. 1, and thus overlapping descriptions will be omitted for conciseness.

The present asynchronous mobile communication network is distinguished in that its RNC and UE are different from those of the conventional asynchronous mobile communication network.

An RNC 211 (see FIG. 2) according to the present invention broadcasts a system information block (SIB) signal. As shown in Table 1 below, the SIB signal includes information about the availability/unavailability of an Always-On mode, which will be simply referred to as "Always-On availability information". A UE 230 (see FIG. 2) according to the present invention transmits to the RNC 211 a radio resource control (RRC) connection request message for requesting an Always-On mode. Upon receipt of the RRC connection request message, the RNC 211 communicates with the core network 100 to maintain a preservation state.

TABLE 1

| Information Element/Group Name | Need | Type and Reference |
|---|---|---|
| Always on Active | OP(OPtional) | 0 = off<br>1 = on |

When the Always-On availability information is "0", it indicates the unavailability of the Always-On mode. On the other hand, when the Always-On availability information is "1", it indicates the availability of the Always-On mode. Table 1 shows an element that is added to a standard "SIB reference name" according to the present invention A wireless connection between the UE 230 and the RNC 211 and a wired connection between the RNC 211 and the core network 100 are established to provide a packet service from the RNC 211 to the UE 230. There is a condition where the above wireless connection is or must be released. The preservation state corresponds to a state where the wired connection between the RNC 211 and the core network 100 is still maintained in the above condition so that the packet service can be provided to the UE 230 directly after re-establishment of the wireless connection without a delay caused by re-establishment of the wired connection.

For packet communication, the SIB signal including the Always-On availability information is broadcast from the RNC 211 to the UE 230 at regular intervals. The Always-On mode refers to a mode where the RNC 211 continues to manage the UE 230, registered therein, to be in the preservation state during the registration, which will also be referred to as "Registration with Always-On" mode.

Upon receipt of the SIB signal from the RNC 211, the UE 230 with a packet communication function detects the Always-On availability information in the SIB signal to determine whether the Always-On mode is available. If the Always-On mode is available, the UE 230 generates an RRC connection request message including the Always-On information for requesting the Always-On mode and transmits the generated RRC connection request message to the RNC 211.

The RRC connection request message further includes information about UE IDs and RRC connection establishment cause values. The UE ID may be an International Mobile Station Identification (IMSI) or a Temporary Mobile Station Identification (TMSI), which enables the core network 100 to identify a UE. The RRC connection establishment cause information indicates the cause for a UE to establish an RRC connection, which includes value about termination signal generation, origination signal generation, control message generation, location registration, and Always-On mode setting causes. Table 2 below illustrates establishment causes according to the present invention.

TABLE 2

| Information Element/Group Name | Need | Type and Reference |
|---|---|---|
| Establishment Cause | MP(Mandatory Present) | Always On<br>Registration with Always On |

In Table 2, "Always On" indicates that the establishment cause is an Always-On mode. "Registration with Always On" indicates that the establishment cause is location registration and an Always-On mode. Table 2 shows an element that is added to a standard "RRC connection request reference name" according to the present invention. An example of "Always On" will be described with reference to FIG. 2 and an example of "Registration with Always On" will be described with reference to FIG. 3.

Hereinafter, a method for reducing the amount of delay time required to establish a packet communication in a mobile communication system according to the present invention will now be described in detail with reference to FIGS. 2 and 3.

Figure 2:
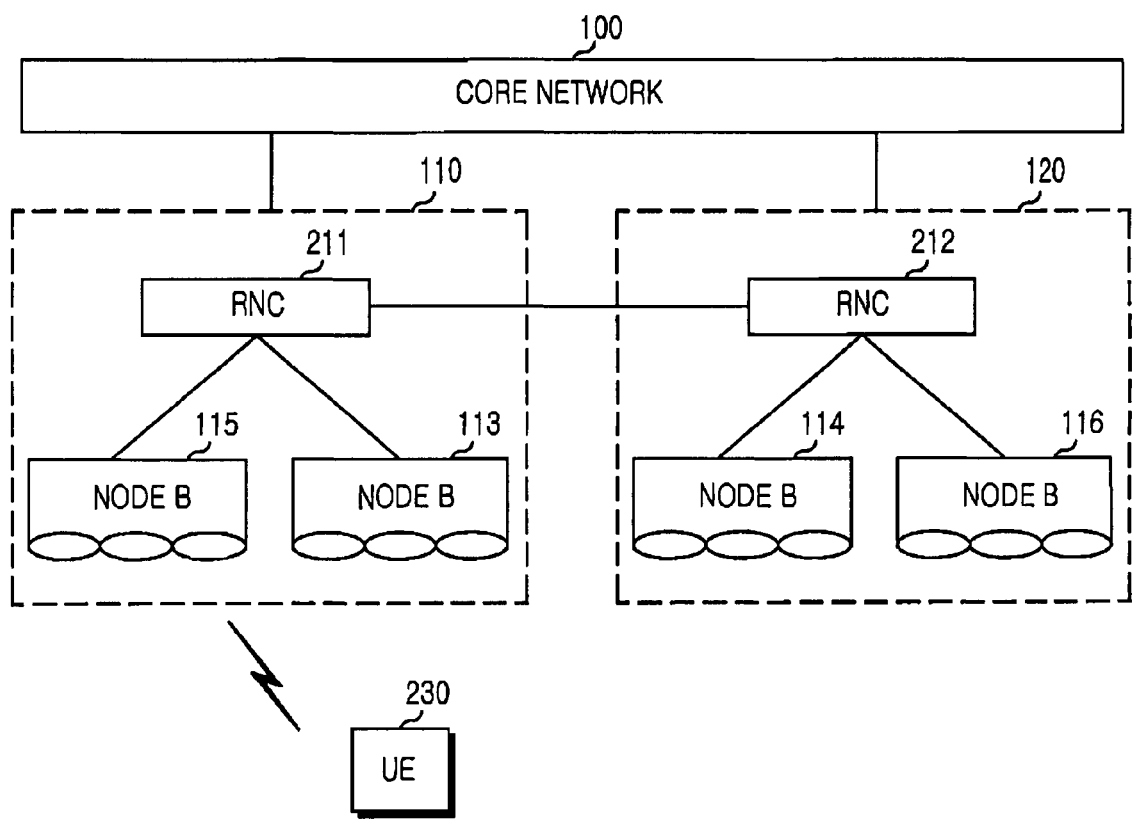
FIG. 2 is a schematic diagram illustrating a procedure for setting an Always-On mode in a packet communication apparatus of a mobile communication system according to the present invention.

FIG. 2 is a schematic diagram illustrating a procedure for setting an Always-On mode in a packet communication apparatus of a mobile communication system according to the present invention.

Referring to FIG. 2, the mobile communication system initially establishes a wired connection between the RNC 211 and the core network 100 and maintains the preservation state in order to reduce the amount of time required to establish a packet communication between the UE 230 and the core network 100.

To this end, the RNC 211 transmits to the UE 230 an SIB signal including the Always-On availability information. Upon receipt of the SIB signal from the RNC 211, the UE 230 transmits to the RNC 211 an RRC connection request message including registration information for requesting location registration, and performs a location registration process through the RNC 211. Upon completion of the location registration process, the RNC transmits to the UE 230 an RRC connection release message for releasing a wired connection with the ULE 230.

Upon receipt of the RRC connection release message from the RNC 211, the UE 230 transmits to the RNC 211 an RRC connection request message including the Always-On information and performs a packet service connection process through the RNC 211. Upon completion of the packet service connection process, the RNC 211 transmits an RRC connection release message to the UE 230 to release a wireless connection with the UE 230. At this point, the RNC 211 maintains the preservation state by the wired connection between the core network 100 and the UE 230.

Figure 3:
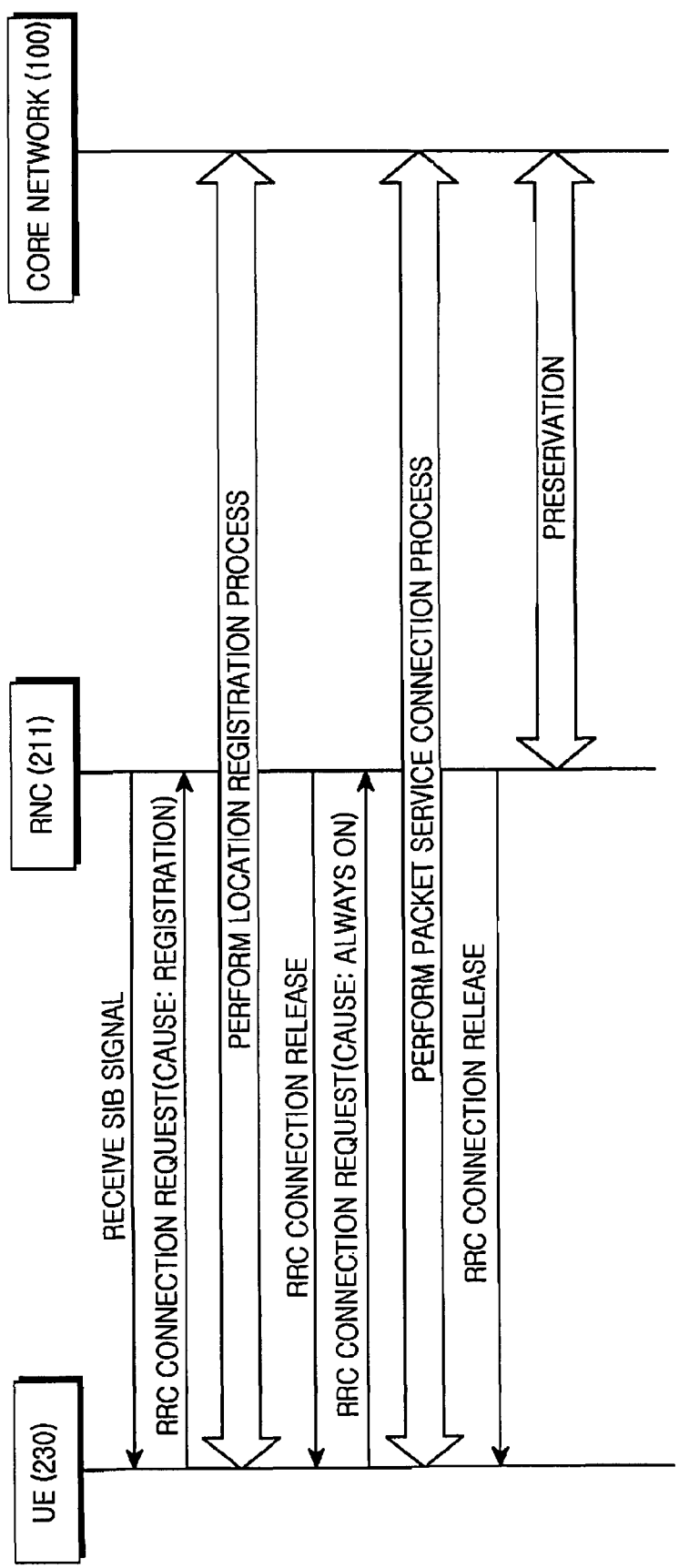
FIG. 3 is a flow diagram illustrating a procedure for setting an Always-On mode in a packet communication apparatus of a mobile communication system according to the present invention.

FIG. 3 is a flow diagram illustrating a procedure for setting an Always-On mode in a packet communication apparatus of a mobile communication system according to the present invention. In this procedure, the wireless connection processes for the location registration and the packet service connection are modified to reduce unnecessary radio resource connection/release processes.

Referring to FIG. 3, the RNC 211 transmits to the UE 230 an SIB signal including the Always-On availability information. Upon receipt of the SIB signal, the UE 230 transmits to the RNC 211 an RRC connection request message including the Always-On information and the registration information for requesting location registration. Upon completion of the location registration process and the packet service connection process, the RNC 211 transmits a RRC connection release message to the UE 230 to release a wireless connection with the UE 230. At this point, the RNC 211 maintains the preservation state by the wired connection between the core network 100 and the UE 230.

As described above, the apparatus and method according to the present invention makes it possible to reduce the amount of time required to establish a packet communication in a mobile communication system by always preserving the packet communication connection with the wired communication section. Accordingly, the packet service connection time can be reduced to offer convenience to users.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication system for providing a packet service, comprising:
   a radio network controller (RNC) for broadcasting a system information block (SIB) signal including Always-On availability information and, upon receipt of a radio resource control (RRC) connection request message for requesting an Always-On mode, maintaining a preservation state in communication with a core network; and
   a user equipment (UE) for detecting the Always-On availability information in the SIB signal received from the RNC to determine whether the Always-On mode is available and, if the Always-On mode is available, generating the RRC connection request message to transmit the generated RRC connection request message to the RNC.

2. The mobile communication system of claim 1, wherein the Always-On mode manages a wired communication connection between the core network and the RNC to maintain the UE in the preservation state.

3. The mobile communication system of claim 1, wherein the RRC connection request message includes an ID of the UE and RRC connection establishment cause values including location registration and the Always-On mode.

4. A mobile communication terminal for providing a packet service, comprising:
   means for detecting an Always-On availability information in a system information block (SIB) signal received from a radio network controller (RNC) to determine whether the Always-On mode is available; and
   means for generating a radio resource control (RRC) connection request message to transmit the generated RRC connection request message to the RNC, if the Always-On mode is available.

5. The mobile communication terminal of claim 4, wherein the Always-On mode manages a wired communication connection between the core network and the RNC to maintain the mobile communication terminal in the preservation state.

6. The mobile communication terminal of claim 4, wherein the RRC connection request message includes an ID (Identification) of the terminal and RRC connection establishment cause values including location registration and the Always-On mode.

* * * * *